United States Patent
Yun et al.

(10) Patent No.: US 7,256,858 B2
(45) Date of Patent: Aug. 14, 2007

(54) LIQUID CRYSTAL DISPLAY HAVING A SWITCHING PIN AND A DUMMY OUTPUT PIN IN DRIVER IC

(75) Inventors: Sai Chang Yun, Kumi-shi (KR); Hong Sung Song, Kumi-shi (KR)

(73) Assignee: LG.Philips LCD CO., Ltd., Seoul (KR)

( * ) Notice: Subject to any disclaimer, the term of this patent is extended or adjusted under 35 U.S.C. 154(b) by 0 days.

(21) Appl. No.: 10/318,023

(22) Filed: Dec. 13, 2002

(65) Prior Publication Data

US 2003/0197826 A1    Oct. 23, 2003

(30) Foreign Application Priority Data

Apr. 20, 2002    (KR)    ............... 2002-21794

(51) Int. Cl.
G02F 1/136    (2006.01)
G02F 1/1333    (2006.01)
G02F 1/1345    (2006.01)

(52) U.S. Cl. .................... 349/149; 349/150; 349/42; 349/54; 345/87; 345/206; 257/668

(58) Field of Classification Search ................ 349/149, 349/54, 42, 150; 345/87, 206; 257/668
See application file for complete search history.

(56) References Cited

U.S. PATENT DOCUMENTS

| | | | | |
|---|---|---|---|---|
| 5,402,255 | A * | 3/1995 | Nakanishi et al. | 349/150 |
| 5,763,940 | A * | 6/1998 | Shibusawa et al. | 257/668 |
| 5,945,984 | A * | 8/1999 | Kuwashiro | 345/206 |
| 6,333,729 | B1* | 12/2001 | Ha | 345/98 |
| 6,909,415 | B2* | 6/2005 | Kumagawa et al. | 345/92 |
| 6,933,910 | B2* | 8/2005 | Kodate et al. | 345/55 |
| 2001/0015709 | A1* | 8/2001 | Imajo et al. | 345/87 |
| 2002/0003590 | A1* | 1/2002 | Ko et al. | 349/54 |
| 2002/0018155 | A1* | 2/2002 | Nagata et al. | 349/42 |
| 2002/0075439 | A1* | 6/2002 | Uehara | 349/149 |

* cited by examiner

*Primary Examiner*—Huyen Ngo
(74) *Attorney, Agent, or Firm*—McKenna Long & Aldridge LLP

(57) ABSTRACT

A liquid crystal display includes driver integrated circuits for applying a video signal to data lines, output pins and at least one dummy output pin are arranged within each data driver integrated circuit, and a switching pin is arranged within each data driver integrated circuit for controlling whether or not the dummy output pin outputs a signal.

9 Claims, 7 Drawing Sheets

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.4B
RELATED ART

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

LIQUID CRYSTAL DISPLAY HAVING A SWITCHING PIN AND A DUMMY OUTPUT PIN IN DRIVER IC

This application claims the benefit of Korean Patent Application No. 2002-21794, filed on Apr. 20, 2002, which is hereby incorporated by reference for all purposes as if fully set forth herein.

BACKGROUND OF THE INVENTION

1. Field of the Invention

This present invention relates to a liquid crystal display, and more particularly to a liquid crystal display driven according to a dot inversion method using a data driver driven according to a column inversion method, wherein a short circuit of a link is prevented.

2. Description of the Related Art

Generally, liquid crystal displays typically include a liquid crystal display panel having a plurality of liquid crystal cells arranged in a matrix pattern and driving circuit for driving the liquid crystal display panel. To display pictures, liquid crystal displays control light transmittance characteristics of the liquid crystal cells in accordance with inputted video signals.

The liquid crystal cells are located at areas defined by crossings of gate lines and data lines. Each the liquid crystal cell is provided with a common electrode and a pixel electrode with which an electric field may be generated. Each pixel electrode is connected to a corresponding data line via a switching device such as a thin film transistor (TFT). A terminal of a TFT is connected to a gate line such that video signals may be applied to corresponding pixel electrodes. The driving circuit includes a gate driver for driving gate lines, a data driver for driving data lines, and a common voltage generator for driving the common electrode.

The gate driver sequentially scans the gate lines of the liquid crystal display panel, supplies gate signals to gate lines, and drives the liquid crystal cells on the liquid crystal display panel one gate line at a time. Whenever a gate signal is supplied to a gate line, the data driver supplies suitable video signals to each of data lines crossing that scanned gate line while the common voltage generator supplies common voltage signals to the common electrode. Depending on the video signal applied to the data line, an orientation of molecules of liquid crystal material provided within the liquid crystal cell, between the pixel and common electrodes, may be altered and the light transmittance of the liquid crystal cell may be controlled. Accordingly, as the light transmittances of each of the liquid crystal cells in the liquid crystal display panel are individually controlled, the liquid crystal display panel may display a picture.

FIG. 1 illustrates a schematic view of a related art liquid crystal display.

Referring to FIG. 1, liquid crystal displays typically include a liquid crystal display panel 2 having a plurality of liquid crystal cells arranged in a matrix pattern, a gate driver 4 for driving gate lines GL1 to GLn arranged in the liquid crystal display panel 2, and a data driver 6 for driving data lines DL1 to DLm also arranged in the liquid crystal display panel 2.

Each of the liquid crystal cells includes a TFT that responds to gate signals applied to the gate lines GL1 to GLn by supplying video signals, applied to the data lines DL1 to DLm, to the liquid crystal cells. Each liquid crystal cell can be represented as a pixel electrode and a common electrode connected to each other via a TFT and a liquid crystal capacitor Clc. A storage capacitor (not shown), for maintaining a voltage of the video signal, is included within the liquid crystal cell. The storage capacitor maintains the charge within liquid crystal capacitor Clc until the next video signal is supplied.

Storage capacitors of liquid crystal cells are formed between preceding gate electrodes and pixel electrodes of each liquid crystal cell. The gate driver 4 sequentially applies gate signals to gate lines GL1 to GLn to drive the corresponding TFTs. The data driver 6 converts inputted video data into analog video signals and supplies analog video signals, specific to the scanned gate line, to the data lines DL1 to DLm during the period when the gate signal is supplied to the scanned gate line. Additionally, the data driver 6 converts inputted video data into liquid crystal cells by the column inversion method, however, is disadvantageous in that a flicker phenomenon is induced in vertical lines due to electrical cross-talk between liquid crystal cells arranged along the data lines.

Referring to FIGS. 4A and 4B, when driven according to the dot inversion method, the polarity of a video signal supplied to a liquid crystal cell is opposite the polarity of video signals supplied to adjacent liquid crystal cells (e.g., liquid crystal cells connected to adjacent gate and data lines). Further, the polarities of the video signals applied to the liquid crystal cells are inverted every frame. Driving liquid crystal cells by the dot inversion method offsets any flicker phenomenon that may be induced between vertically or horizontally adjacent liquid crystal cells. Accordingly, pictures generated by the liquid crystal display panel driven using the dot inversion method have superior qualities over pictures generated by liquid crystal display panels driven using other inversion methods.

Use of the dot inversion method, however, is disadvantageous in that the polarity of video signals supplied from the data driver to the data line need to be inverted in horizontal and vertical directions and individual pixel voltages required by the dot inversion method are typically greater than those required by other inversion methods. Accordingly, liquid crystal displays driven using a dot inversion method typically consume a relatively large amount of power during their operation.

SUMMARY OF THE INVENTION

Accordingly, the present invention is directed to a liquid crystal display that substantially obviates one or more of the problems due to limitations and disadvantages of the related art.

An advantage of the present invention provides a liquid crystal display driven by a dot inversion method using a data driver driven by a column inversion method, wherein such a liquid crystal display is capable of consuming a relatively small amount of power during its operation.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device may include data driver including driver integrated circuits for applying video signals to the data lines, a plurality of output pins and at least one dummy output pin arranged within each driver integrated circuit, and a switching pin arranged within each driver integrated circuit for controlling whether or not the dummy output pin outputs a video signal.

In one aspect of the present invention, only one dummy output pin is arranged within each of the driver integrated circuits.

In another aspect of the present invention, only one dummy output pin may output a video signal.

In yet another aspect of the present invention, only the dummy output pin arranged within the driver integrated circuit applying a driving signal to the first data line may output the video signal.

In still another aspect of the present invention, only the dummy output pin arranged within the driver integrated circuit applying a driving signal to last data line may output the video signal.

According to the principles of the present invention, the liquid crystal display may further include tape carrier packages, wherein each of the driver integrated circuits may be mounted to a respective tape carrier package, tape carrier package pads connected to respective ones of the output pins, a dummy tape carrier package pad connected to a dummy output pin, data pads connected to the tape carrier package pads, a dummy data pad connected to the dummy tape carrier package pad, and links for electrically connecting the data pads to respective ones of the data lines.

In one aspect of the present invention, only one dummy data pad is connected to a link.

In another aspect of the present invention, a driving signal may be applied from a driver integrated circuit to the first data line via a dummy data pad.

In yet another aspect of the present invention, a driving signal may be applied from a driver integrated circuit to the last data line via a dummy data pad.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 2A and 2B illustrate a line inversion method of driving a liquid crystal display;

FIGS. 3A and 3B illustrate a column inversion method of driving a liquid crystal display;

Figures 4A, 4B:
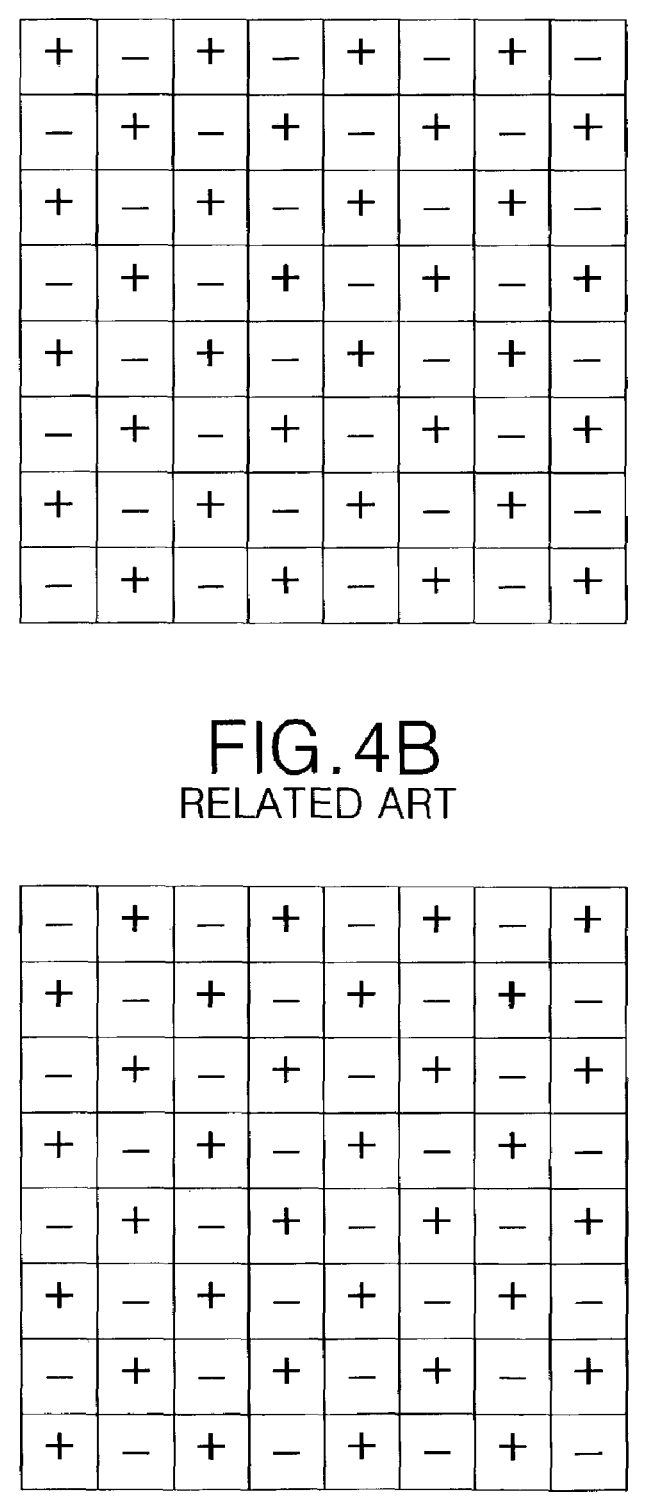

FIGS. 4A and 4B illustrate a dot inversion method of driving a liquid crystal display;

DETAILED DESCRIPTION OF THE ILLUSTRATED EMBODIMENTS

Reference will now be made in detail to embodiments of the present invention, examples of which are illustrated in the accompanying drawings.

Figure 5:
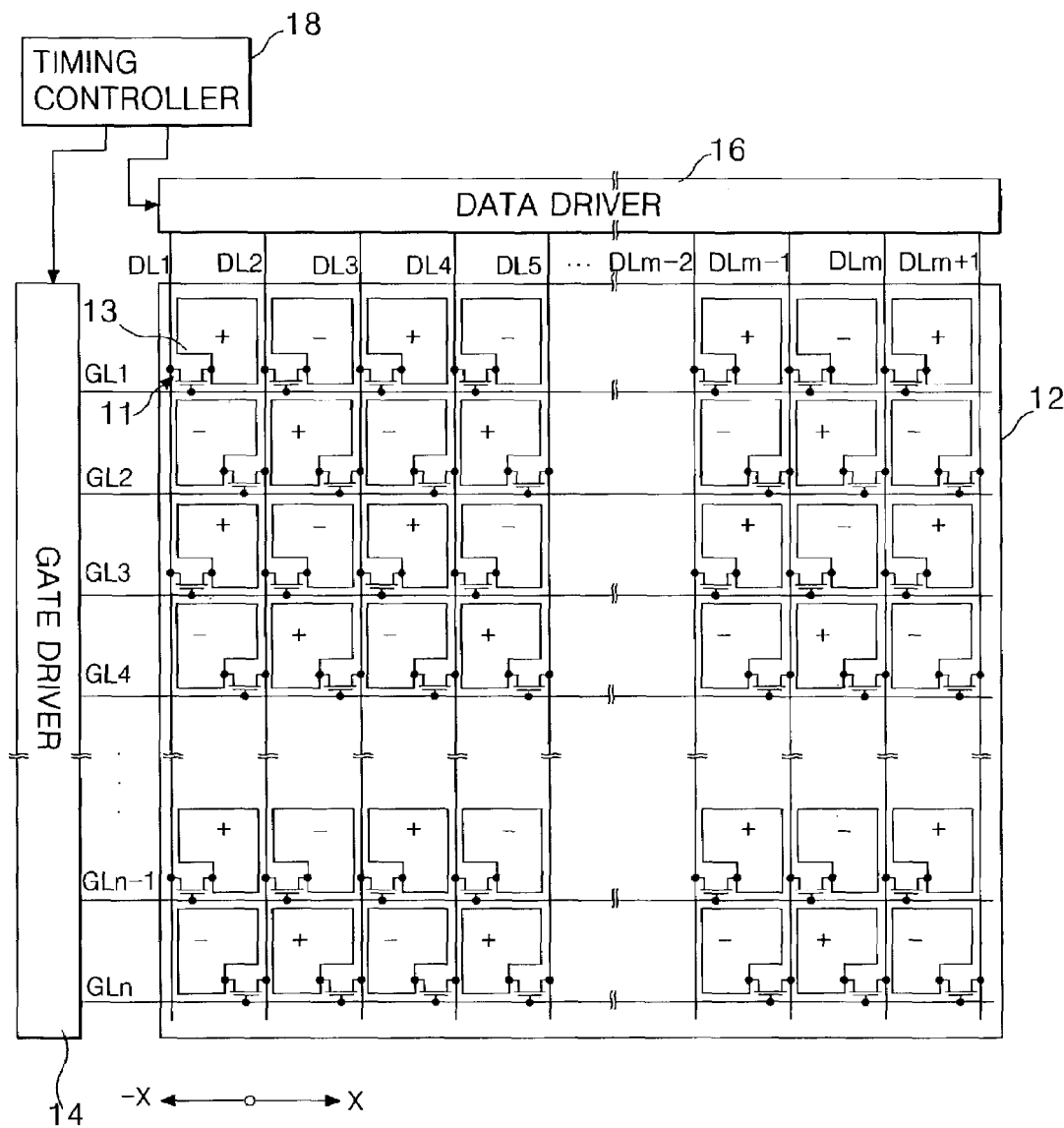
FIG. 5 illustrates a schematic view of a liquid crystal display according to a first aspect of the present invention.

FIG. 5 illustrates a schematic view of a liquid crystal display according to a first aspect of the present invention.

Referring to FIG. 5, a liquid crystal display may, for example, include a liquid crystal display panel 12 having a plurality of liquid crystal cells arranged in a matrix pattern, a gate driver 14 for driving gate lines GL1 to GLn arranged in the liquid crystal display panel 12, a data driver 16 for driving data lines DL1 to DLm+1 also arranged in the liquid crystal display panel 12, and a timing controller 18 for controlling the gate and data drivers 14 and 16, respectively. analog video signals using gamma voltages supplied from a gamma voltage generator (not shown).

Figure 1:
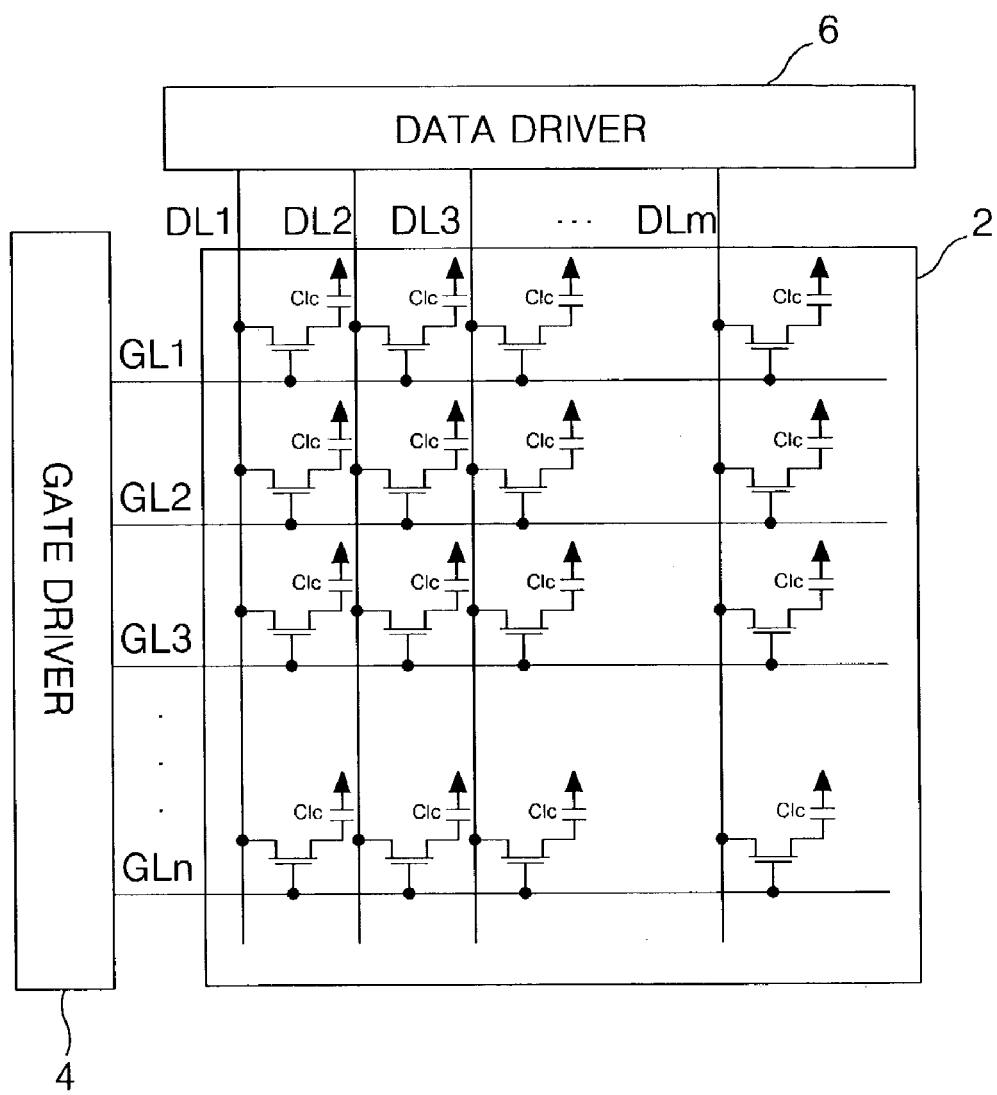
FIG. 1 illustrates a schematic view of a related art liquid crystal display.

Liquid crystal cells within liquid crystal display panels such as those illustrated in FIG. 1 may be driven according to various inversion methods including frame, line, column, and dot inversion methods.

When driven according to the frame inversion method, the polarity of video signals supplied to the liquid crystal cells is inverted every frame.

Figures 2A, 2B:
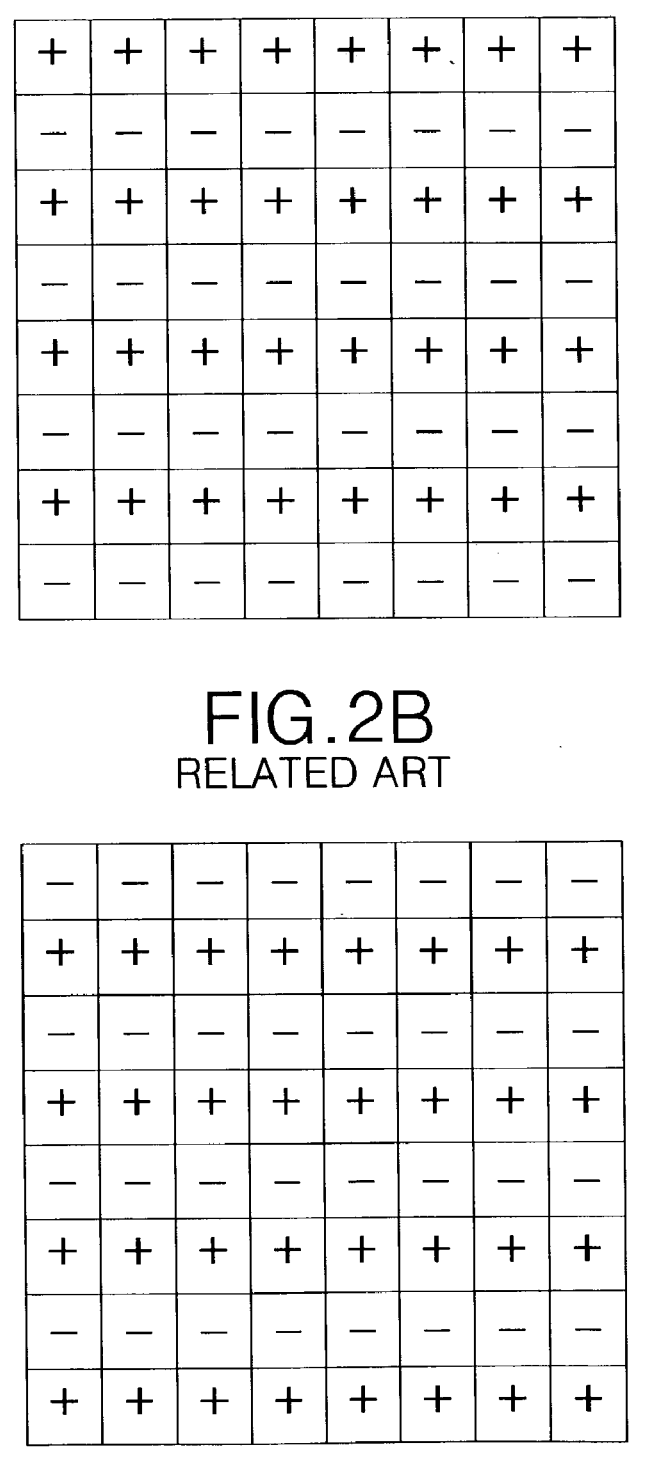

Referring to FIGS. 2A and 2B, when driven according to the line inversion method, the polarity of video signals supplied to liquid crystal cells connected to a gate line is opposite the polarity of video signals supplied to liquid crystal cells connected to gate lines adjacent that gate line. Further, the polarities of the video signals applied to the liquid crystal cells are inverted every frame. Driving liquid crystal cells by the line inversion method, however, is disadvantageous in that a flicker phenomenon is induced in horizontal lines due to electrical cross-talk between liquid crystal cells arranged along the gate lines.

Figures 3A, 3B:
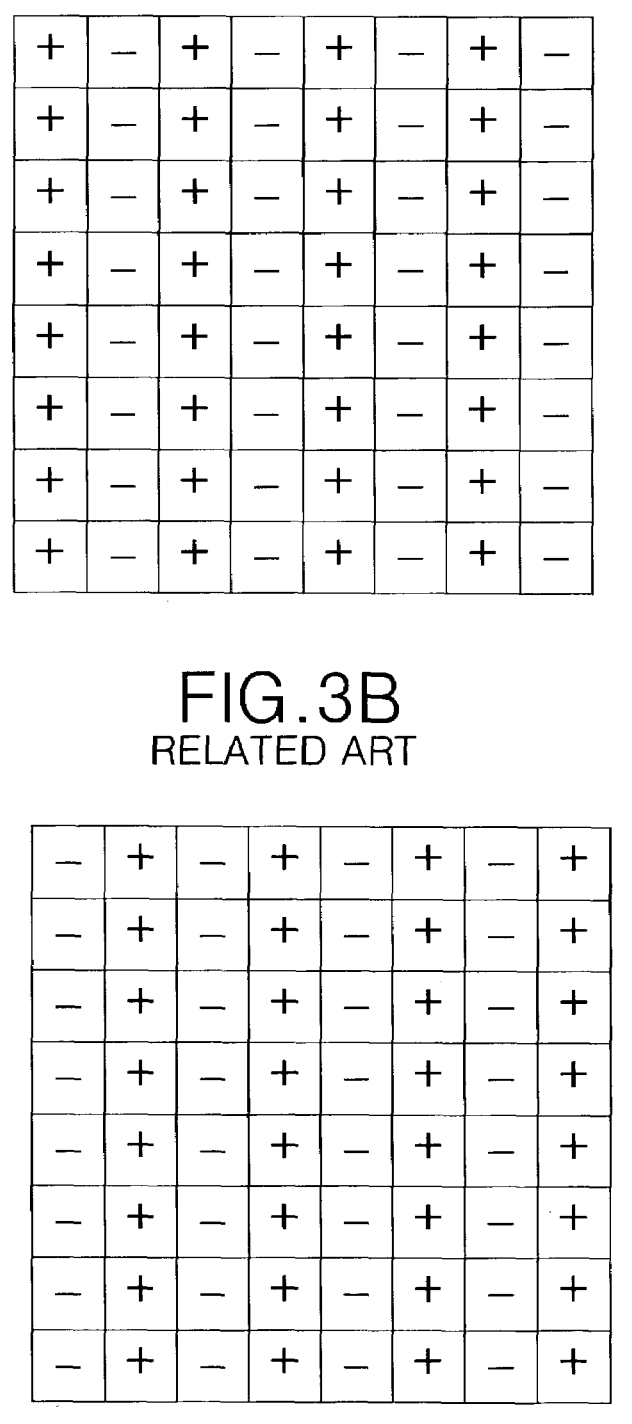

Referring to FIGS. 3A and 3B, when driven according to the column inversion method, the polarity of video signals supplied to liquid crystal cells connected to a data line is opposite the polarity of video signals supplied to liquid crystal cells connected to data lines adjacent that data line. Further, the polarities of the video signals applied to the liquid crystal cells are inverted every frame. Driving In one aspect of the present invention, a plurality of gate lines GL1 to GLn and a plurality of data lines DL1 to DLm+1 may be insulated from each other where they cross in the liquid crystal display panel 12. The liquid crystal cells, arranged in a matrix pattern, are provided at every crossing of the gate lines GL1 to GLn and the data lines DL1 to DLm+1. Each liquid crystal cell may include a thin film transistor (TFT) 11 connected to one of gate lines GL1 to GLn and a corresponding one of data lines DL1 to DLm+1.

Still referring to FIG. 5, liquid crystal cells consecutively arranged within a column may include TFTs 11 that are alternately connected left and right adjacent data lines DL. For example, liquid crystal cells arranged in odd numbered horizontal lines (e.g., liquid crystal cells including TFTs 11 connected to odd numbered gate lines GL1, GL3, GL5, etc.) may be connected to the first to $m^{th}$ data lines DL1 to DLm arranged in a −X axis direction with respect to a terminal connecting the TFT 11 to the gate line GL. Liquid crystal cells of even numbered horizontal lines (e.g., liquid crystal cells including TFTs 11 connected to even numbered gate lines GL2, GL4, GL6, etc.) may be connected to the second to $(m+1)^{th}$ data lines DL2 to DLm+1 arranged in a +X axis direction with respect to a terminal connecting the TFT 11 to the gate line GL.

The TFTs 11 respond to gate signals applied to gate lines GL1 to GLn by supplying video signals, applied to the data lines DL1 to DLm+1, to the liquid crystal cells. Depending on the video signal applied to the data line, an orientation of liquid crystal molecules (not shown) included within the liquid crystal cell, between a common electrode (not shown) and a pixel electrode 13, may be altered and the light transmittance of the liquid crystal cell may thereby be controlled. Accordingly, as the light transmittances of each of the liquid crystal cells in the liquid crystal display panel are individually controlled, the liquid crystal display panel may display a picture.

The gate driver 14 scans and sequentially applies gate signals to the gate lines GL1 to GLn to drive the corresponding TFTs 11. The data driver 16 converts inputted video data into analog video signals and supplies analog video signals, specific to the scanned gate line, to the data lines DL1 to DLm+1 during the period when the gate signal is supplied to the scanned gate line. Additionally, the data driver 16 may convert inputted video data into analog video signals using gamma voltages supplied from a gamma voltage generator (not shown).

In one aspect of the present invention, the data driver 16 may supply video signals to data lines DL1 to DLm+1 using a column inversion driving method. For example, the data driver 16 may supply video signals having a first polarity to the odd numbered data lines DL1, DL3, etc., and supply video signals having a second polarity, opposite the first polarity, to the even numbered data lines DL2, DL4, etc. In one aspect of the present invention, the data driver 16 may supply video signals to the liquid crystal cells in the liquid crystal display illustrated in FIG. 5 via data lines DL1 to DLm+1 in every horizontal period. Alternatively, the data driver 16 may supply the video signals by shifting them to the right by one channel. Accordingly, the data driver 16 may be driven by a column inversion method and the video signals may be applied directly to the data lines or they may be shifted to the right by one channel before being applied to the data lines, thereby driving the liquid crystal cells of the liquid crystal display by a dot inversion method.

In one aspect of the present invention, the data driver 16 may apply video signals to odd numbered horizontal lines via the first to $m^{th}$ data lines DL1 to DLm. Subsequently, the data driver 16 may apply video signals to even numbered horizontal lines via the second to $(m+1)^{th}$ data lines DL2 to DLm+1 by shifting the previously applied video signals to the right by one channel to each of the data lines.

For example, in a first horizontal period when the first gate line GL1 is driven, video signals having a positive polarity applied from the data driver 16 may be supplied to the odd numbered liquid crystal cells connected to odd numbered data lines DL1, DL3, etc., while video signals having a negative polarity applied from the data driver 16 may supplied to the even numbered liquid crystal cells connected to the even numbered data lines DL2, DL2, etc. Subsequently, in a second horizontal period when, for example, the second gate line GL2 is driven, the data driver 16 shifts the video signals applied in the first horizontal period to the right by one channel such that video signals having a negative polarity are applied to the odd numbered liquid crystal cells connected to the even numbered data lines DL2, DL4, etc., video signals having a positive polarity may be applied to the even numbered liquid crystal cells connected the odd numbered data lines DL3, DL5, etc. Accordingly, the data driver 16 may be driven by a column inversion method while liquid crystal cells of the liquid crystal display panel 12 may be driven by a dot inversion method.

As shown in FIG. 5, consecutive liquid crystal cells arranged within a column may be alternately connected to left and right adjacent data lines may be driven using a dot inversion method while the data driver is driven by a column inversion method. Accordingly, the liquid crystal display shown in FIG. 5 may consume a relatively small amount of power during its operation compared to liquid crystal displays using data drivers driven according to dot inversion methods such as those illustrated in FIG. 1.

Figure 6:
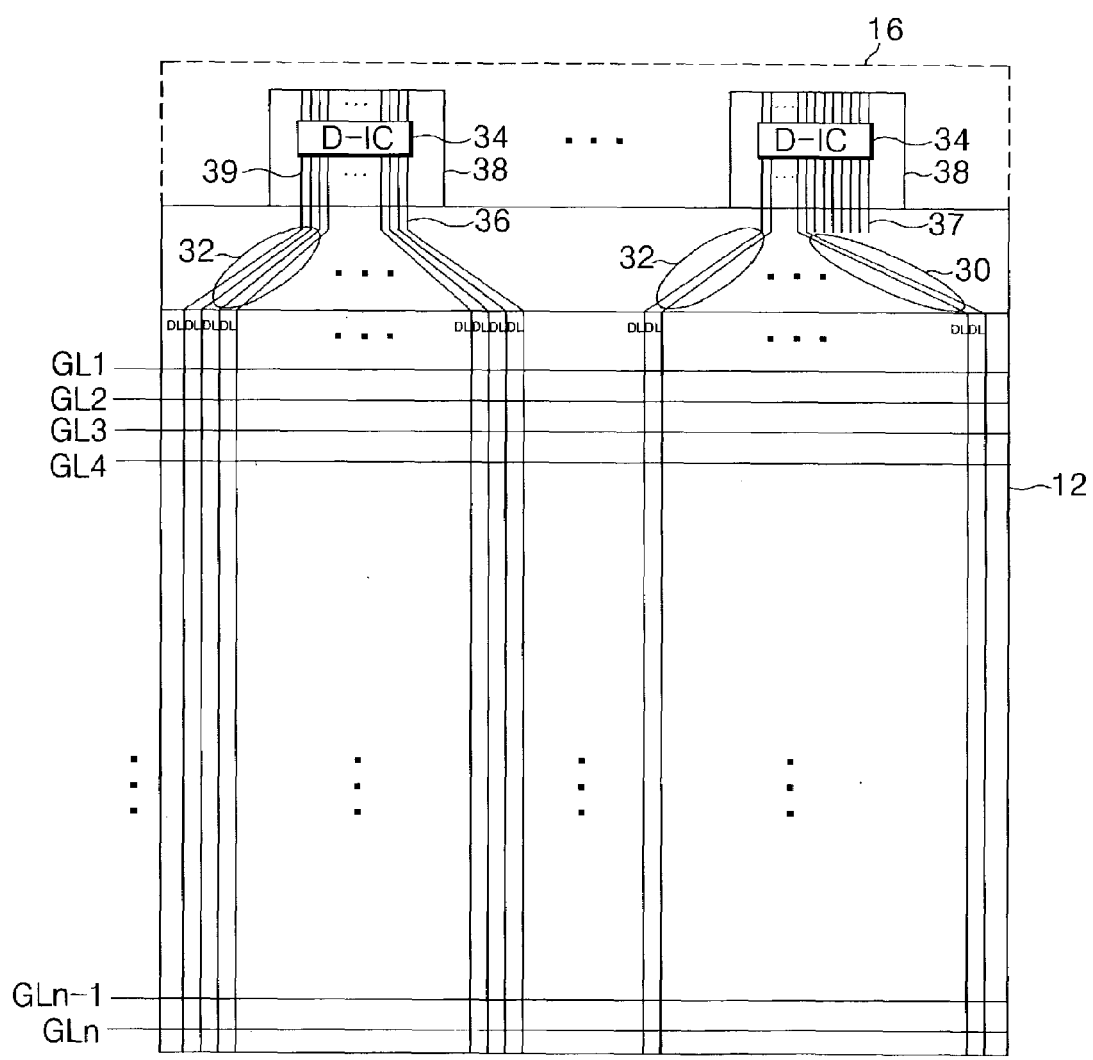
FIG. 6 illustrates a schematic view of driver integrated circuits arranged within the data driver shown in FIG. 5.

Referring now to FIG. 6, according one aspect of the present invention, the data driver 16 may include a plurality of driver integrated circuits (D-ICs) 34 mounted onto respective ones of tape carrier packages (TCPs) 38. The D-ICs 34 may be electrically connected to the data lines DL1 to DLm+1 via TCP pads 39, data pads 36, and links 30 and 32. Accordingly, the D-ICs 34 may apply predetermined video signals to the data lines DL1 to DLm+1 in response to externally supplied driving signals.

According to the principles of the present invention, the number of TCP pads 39 connected to each of the D-ICs 34 may correspond to a resolution of the liquid crystal display panel. For example, eight D-ICs 34 may be arranged within an XGA liquid crystal display panel to supply video signals to sets of 384 (128×3) data lines DL for driving the 3072 (1024×3) data lines DL. Further, ten D-ICs 34 may be arranged within an SXGA liquid crystal display panel to supply video signals to sets of 420 (140×3) data lines DL for driving the 4200 (1400×3) data lines DL. Still further, ten D-ICs 34 may be arranged within a UXGA liquid crystal display panel to supply video signals to sets of 480 (160×3) data lines DL for driving the 4800 (1600×3) data lines DL.

The liquid crystal display panel 12 may, for example, include one more data line (DLm+1) than liquid crystal display panels such as those illustrated in FIG. 1 having only DLm data lines. Accordingly, each of the D-IC 34 may, for example, include one extra output line compared to D-ICs within data drivers such as those illustrated in FIG. 1. For example, each of the D-ICs 34 may include 385 output lines connected to respective ones of data lines DL within the XGA liquid crystal display panel. Further, each of the D-ICs 34 may include 421 output lines connected to respective ones of data lines DL within the SXGA liquid crystal display panel. Still further, each of the D-ICs 34 may include 481 output lines connected to respective ones of data lines DL within the UXGA liquid crystal display panel.

Since each of the additional output lines arranged within the D-ICs 34 are connected to data lines DL within the liquid crystal display panel, a dummy output line 37 included within the D-IC 34 connected to the last data line DLm+1 is not used. Because each of the D-ICs 34 include an additional output line, one dummy output pin (not shown) is formed in each of the D-ICs 34. Accordingly, seven additional (dummy) output lines 37 are provided in one D-IC 34 because consecutive ones of the additional output lines in preceding D-ICs 34 are connected to data lines DL. Therefore, a length of the last link 30 connected to the last data line DLm+1 has a length greater than lengths of other links 32 connected to other data lines DL1 to DLm.

As the length of the last link 30 increases, a timing with which video signals may be applied to the data lines DL to DLm+1 becomes non-uniform and accurate video data cannot be uniformly supplied to the data lines DL within the liquid crystal display panel. Additionally, a spacing between last link 30 and a link adjacent the last link is smaller than a spacing between other adjacent links 32. Accordingly, a short circuit in the last link 30 may occur as a result of the reduced spacing.

Figure 7:
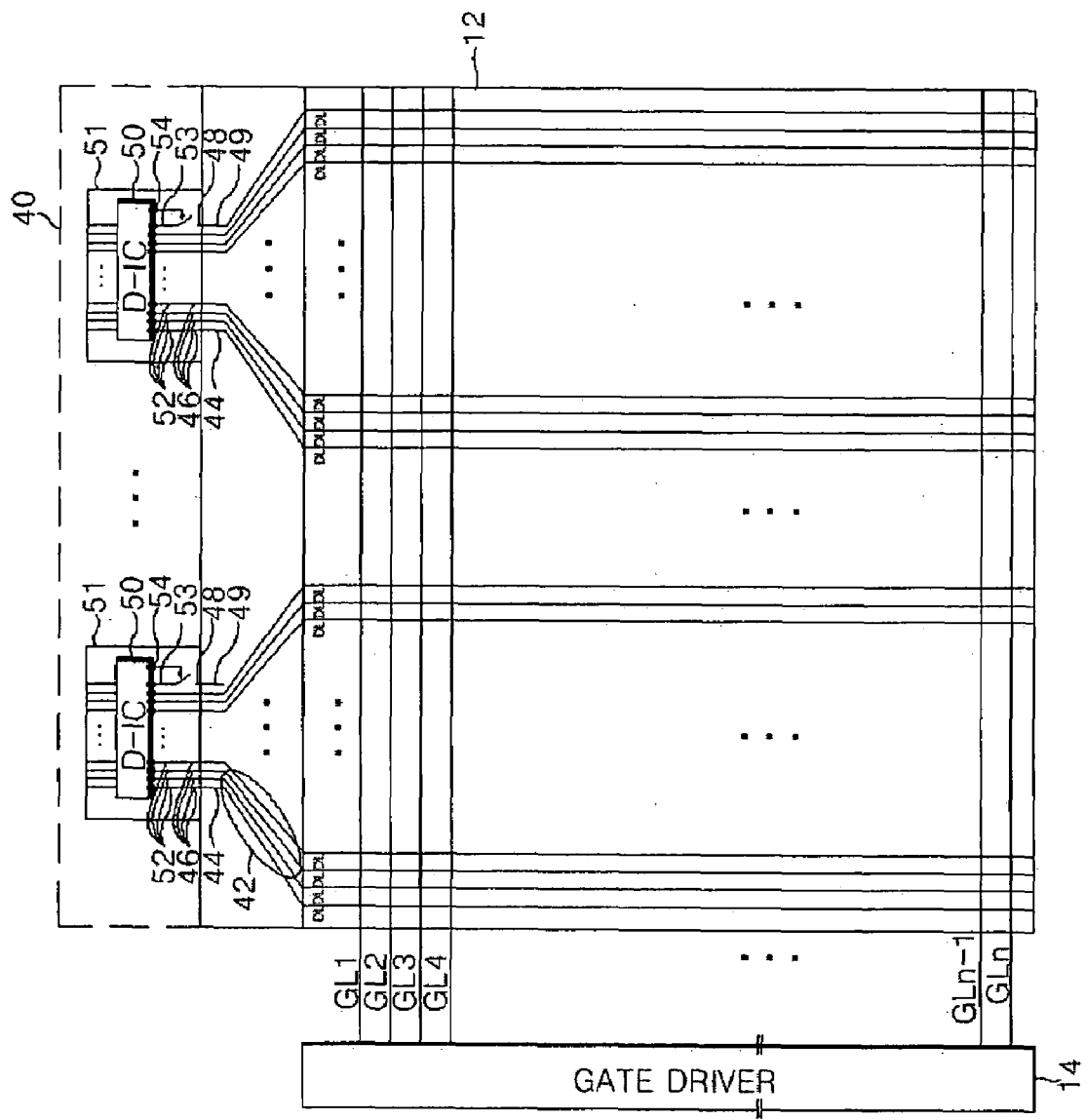
FIG. 7 illustrates a schematic view of driver integrated circuits arranged within a data driver according to a second aspect of the present invention.

FIG. 7 illustrates a schematic view of driver integrated circuits arranged within a data driver according to a second aspect of the present invention Referring to FIG. 7, the configuration liquid crystal display of the second aspect of the present invention is essentially the same as that shown in FIG. 5, with the exception of the data driver 40. Accordingly, the liquid crystal display according to the second aspect of the present invention may, for example, include a liquid crystal display panel 12 having a plurality of liquid crystal cells arranged in a matrix pattern, a gate driver 14 for driving gate lines GL1 to GLn arranged in the liquid crystal display panel 12, and a data driver 40 for driving data lines DL1 to DLm+1 also arranged in the liquid crystal display panel 12.

In one aspect of the present invention, a plurality of gate lines GL1 to GLn and a plurality of data lines DL1 to DLm+1 may be insulated from each other where they cross in the liquid crystal display panel 12. The liquid crystal cells, arranged in a matrix pattern, are provided at every crossing of the gate lines GL1 to GLn and the data lines DL1 to DLm+1. Each liquid crystal cell may include a thin film transistor (TFT) connected to one of gate lines GL1 to GLn and a corresponding one of data lines DL1 to DLm+1

Although not shown, liquid crystal cells consecutively arranged within a column may include TFTs that are alternately connected left and right adjacent data lines DL. For example, liquid crystal cells arranged in odd numbered horizontal lines (e.g., liquid crystal cells including TFTs connected to odd numbered gate lines GL1, GL3, GL5, etc.) may be connected to the first to $m^{th}$ data lines DL1 to DLm arranged to the left of a terminal connecting the TFT to the gate line GL. Liquid crystal cells of even numbered horizontal lines (e.g., liquid crystal cells including TFTs connected to even numbered gate lines GL2, GL4, GL6, etc.) may be connected to the second to $(m+1)^{th}$ data lines DL2 to DLm+1 arranged to the right of a terminal connecting the TFT to the gate line GL.

The gate driver 14 scans and sequentially applies gate signals to the gate lines GL1 to GLn to drive the corresponding TFTs. The data driver 40 converts inputted video data into analog video signals and supplies analog video signals, specific to the scanned gate line, to the data lines DL1 to DLm+1 during the period when the gate signal is supplied to the scanned gate line. Additionally, the data driver 40 may convert inputted video data into analog video signals using gamma voltages supplied from a gamma voltage generator (not shown).

In one aspect of the present invention, the data driver 40 may supply video signals to the data lines DL1 to DLm+1 using a column inversion driving method. For example, the data driver 40 may supply video signals having a first polarity to the odd numbered data lines DL1, DL3, etc., and supply video signals having a second polarity, opposite the first polarity, to the even numbered data lines DL2, DL4, etc. In one aspect of the present invention, the data driver 40 may supply video signals to the liquid crystal display illustrated in FIG. 7 via data lines DL1 to DL1+m in every horizontal period. Alternatively, the data driver 40 may supply the video signals by shifting them to the right by one channel. Accordingly, the data driver 40 may be driven by a column inversion method and the video signals may be applied directly to the data lines or they may be shifted to the right by one channel before being applied to the data lines, thereby driving the liquid crystal cells of the liquid crystal display by a dot inversion method.

According to the principles of the present invention, the data driver 40 may include a plurality of driver integrated circuits (D-ICs) 50. The D-ICs 50 may be mounted onto respective ones of tape carrier packages (TCPs) 51. The D-ICs 50 may be electrically connected to the data lines DL1 to DLm+1 via TCP pads 46, data pads 44, and links 42. The D-ICs 50 may apply predetermined video signals to the data lines DL1 to DLm+1 in response to externally supplied driving signals.

According to the principles of the present invention, the D-ICs 50 may include one dummy output pin 53 connected between a dummy TCP pad 48 and a corresponding dummy data pad 49. For example, eight D-ICs 50 may be arranged within an XGA liquid crystal display panel. Accordingly, each of the eight D-ICs 50 may include a dummy TCP pad 48 connected to a respective ones of the dummy data pads 49 via a dummy output pin 53 provided in each of the D-ICs 50. Video signals may be applied only to the dummy TCP pad 48 and the dummy data pad 49 of the D-IC 50 connected to the last data line DLm+1. Accordingly, video signals may not be applied to dummy TCP pads 48 and dummy data pads 49 of any of the other seven D-ICs 50. In FIG. 7, reference number 52 refers to the output pins of D-ICs 50.

According to another aspect of the present invention, each of the D-ICs 50 may further include a switching pin 54. Generally, the switching pin 54 determines whether or not the video signals are applied to the dummy output pin 53. For example, when the switching pin 54 is in an OFF state, video signals are not applied to the dummy output pin 53. When the switching pin 54 is in an ON state, video signals are applied to the dummy output pin 53. In one aspect of the present invention, each of the D-ICs 50 includes only one switching pin 54 that is in an ON state while the rest of the switching pins 54 within that D-IC 50 are in an OFF state.

For example, only the switching pin 54 of the D-IC 50 connected to the last data line DLm+1 or the first data line DL1 is in an ON state. Accordingly, a predetermined video signal may be selectively applied to the last data line DLm+1. In one aspect of the present invention, dummy output lines included in the D-IC 50 may be connected to the last data line DLm+1. In another aspect of the present invention, the length of all the link 42 is substantially uniform.

For example, compared to the data driver 16 shown in FIG. 6 where a plurality of dummy output lines 37 exist in the D-IC 34 connected to the last data line DLm+1, no dummy output line exists in the D-IC 50 connected to the last data line DLm+1 within the liquid crystal display panel 12 shown in FIG. 7. Accordingly, both the lengths of and the gaps between the adjacent links 42 may be substantially uniform.

According to the principles of the present invention, TFTs of liquid crystal cells within a column may be alternately connected to adjacent data lines on the left and right, thereby enabling the liquid crystal display panel to be driven by a dot inversion method while the data driver is driven by a column inversion method. The liquid crystal display panel is capable of operating under a reduced power consumption compared to liquid crystal display panels driven using dot inversion systems such as those illustrated in FIG. 1.

Additionally, one dummy output pin may be formed in each of D-ICs included within the data driver such that only one of the dummy output pins within each of the D-ICs applies video signals. Further, lengths of and gaps between adjacent links are substantially uniform.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
    a liquid crystal display panel;
    a plurality of gate lines;
    a plurality of data lines crossing the plurality of gate lines;
    a plurality of liquid crystal cells defined by the crossings of the gate and data lines, wherein each liquid crystal cell includes a thin film transistor, and the thin film transistors in consecutive ones of the plurality of liquid crystal cells within a column are alternately coupled to the two adjacent data lines;
    a data driver comprising a plurality of driver integrated circuits for applying a video signal to the plurality of data lines;
    a plurality of output pins arranged within each of the driver integrated circuits;
    a dummy output pin arranged within each of the driver integrated circuits; and
    a switching pin arranged within each driver integrated circuit for controlling whether or not the dummy output pin outputs the video signal.

2. The liquid crystal display according to claim 1, wherein only one dummy output pin is arranged within each of the driver integrated circuits.

3. The liquid crystal display according to claim 2, wherein said only one dummy output pin arranged within each of the driver integrated circuit outputs the video signal.

4. The liquid crystal display according to claim 3, wherein said only one dummy output pin arranged within a driver integrated circuit applying a driving signal to a first data line outputs the video signal.

5. The liquid crystal display according to claim 3, wherein said only one dummy output pin arranged within a driver integrated circuit applying a driving signal to a last data line outputs the video signal.

6. The liquid crystal display according to claim 1, further comprising:
    a plurality of tape carrier packages, wherein each of the driver integrated circuits is mounted onto respective ones of the plurality of tape carrier packages;
    a plurality of tape carrier package pads connected to the plurality of output pins and including a dummy tape carrier package pad connected to a dummy output pin arranged within each of the driver integrated circuits;
    a plurality of data pads connected to respective ones of the plurality of tape carrier package pads; a dummy data pad connected to the dummy tape carrier package pad; and
    a plurality of links for electrically connecting the plurality of data pads with the plurality of data lines.

7. The liquid crystal display according to claim 6, wherein the dummy data pad is connected to a link.

8. The liquid crystal display according to claim 7, wherein a driving signal is applied from a driver integrated circuit to a first data line via the dummy data pad.

9. The liquid crystal display according to claim 7, wherein a driving signal is applied from a driver integrated circuit to a last data line via the dummy data pad.

* * * * *